United States Patent [19]
Takagawa

[11] Patent Number: 5,699,841
[45] Date of Patent: Dec. 23, 1997

[54] THERMOS BOTTLE

[76] Inventor: Nobuyuki Takagawa, 5-12-20, Sagisu, Fukushima-ku, Osaka, Japan

[21] Appl. No.: 653,005

[22] Filed: May 24, 1996

[51] Int. Cl.⁶ .......................... B65B 39/00; B67C 11/04
[52] U.S. Cl. .................... 141/331; 220/254; 215/309; 222/509; 222/518
[58] Field of Search .................... 141/331, 346, 141/347, 348; 220/254, 290, 86.1; 215/309, 314; 222/481.5, 482, 509, 512, 518

[56]         References Cited
        U.S. PATENT DOCUMENTS 3,809,275   5/1974   Ek ................................. 215/305
4,638,929   1/1987   Stone, Jr. ........................ 222/456
4,658,973   4/1987   Zimmermann .................... 215/314
5,497,917   3/1996   Krimmel et al. ................. 222/482
5,609,194   3/1997   Link et al. ....................... 141/331

Primary Examiner—Henry J. Recla
Assistant Examiner—Timothy L. Maust
Attorney, Agent, or Firm—Moonray Kojima

[57]            ABSTRACT

A thermos bottle for keeping beverages such as coffee, tea, and Japanese tea in hot or cold state, comprising an inner container inside of an outer container, a plug member fitted to an upward opening of the outer container, and a feeding passage for allowing to feed beverage from outside directly into the container in the plug member, in which the beverage can be directly fed into the container, without having to detach or attach the plug member, with the plug member fitted to the outer container, so that the ease of pouring operation is greatly enhanced.

3 Claims, 7 Drawing Sheets

THERMOS BOTTLE

(b) BACKGROUND OF THE INVENTION

1. Field of the Invention

The present invention relates to a thermos bottle for keeping, for example, coffee, tea, Japanese tea or other beverages in hot or cold state.

2. Description of the Prior Art

Hitherto, as a container for keeping coffee prepared by a coffee machine, as an example of the above beverages, a serving pot as shown in FIG. 7 is known.

That is, a pot body 72 has a pouring port 71 at an upper end side, a lid 75 having a knob 74 is detachably fitted to an upward opening 73 of this pot body 72, and a handle 78 is fitted to an outer circumference of a neck 76 of the pot body 72 corresponding to the upward opening 73 through a ring member 77.

In this serving pot, to transfer the coffee from the coffee machine into the pot body 72, once the lid 75 is removed, and it is contained in the pot body 72 through the opened upward opening 73, the lid 75 is closed again, and when necessary the contained coffee is poured out through a comb-shaped opening 79 of the lid 75, and since the lid 75 must be detached and attached when pouring in the beverage, the ease of operation was extremely poor. This was not limited to the serving pot shown in FIG. 7, but similar problems were present in the conventional thermos bottles.

(c) SUMMARY OF THE INVENTION

It is hence a primary object of the invention to provide a thermos bottle capable of pouring beverage directly into an inner container with a plug member kept attached to an outer container, and without having to detach the plug member, by forming a pouring passage for allowing the beverage directly into the inner container from outside in the plug member, thereby notably enhancing the ease of pouring operation.

It is another object of the invention to provide a thermos bottle which is capable of preventing the beverage from being spilled from above a pouring passage when the beverage is being poured, and which is capable of assuring smoother discharge of the beverage. The foregoing object is attained by a temporary reservoir formed above the pouring passage of a plug member, and by a discharge part of the plug member being located opposite a pouring part of an outer container.

It is a further object of the invention to provide a thermos bottle capable of preventing escape of steam or coldness of the beverage kept inside when normal, and pouring out the beverage securely when serving, by installing a movable inner lid in a lower part of a plug member, for closing an upward opening of an outer container when normal, and communicating between the upward opening and pouring part as pushed by beverage when pouring out the beverage.

It is a still further object of the invention to provide a thermos bottle capable of preventing back flow of beverage from the pouring passage of plug member, when the thermos bottle is inclined during the change pouring of the contained beverage, by installing a passage member having an opening which is disposed opposite to the pouring part, in the pouring passage of the plug member.

These and other objects of the invention will be further appreciated from the description of the embodiment given below.

(d) BRIEF DESCRIPTION OF THE DRAWINGS

(e) DESCRIPTION OF THE PREFERRED EMBODIMENT

Figure 1:
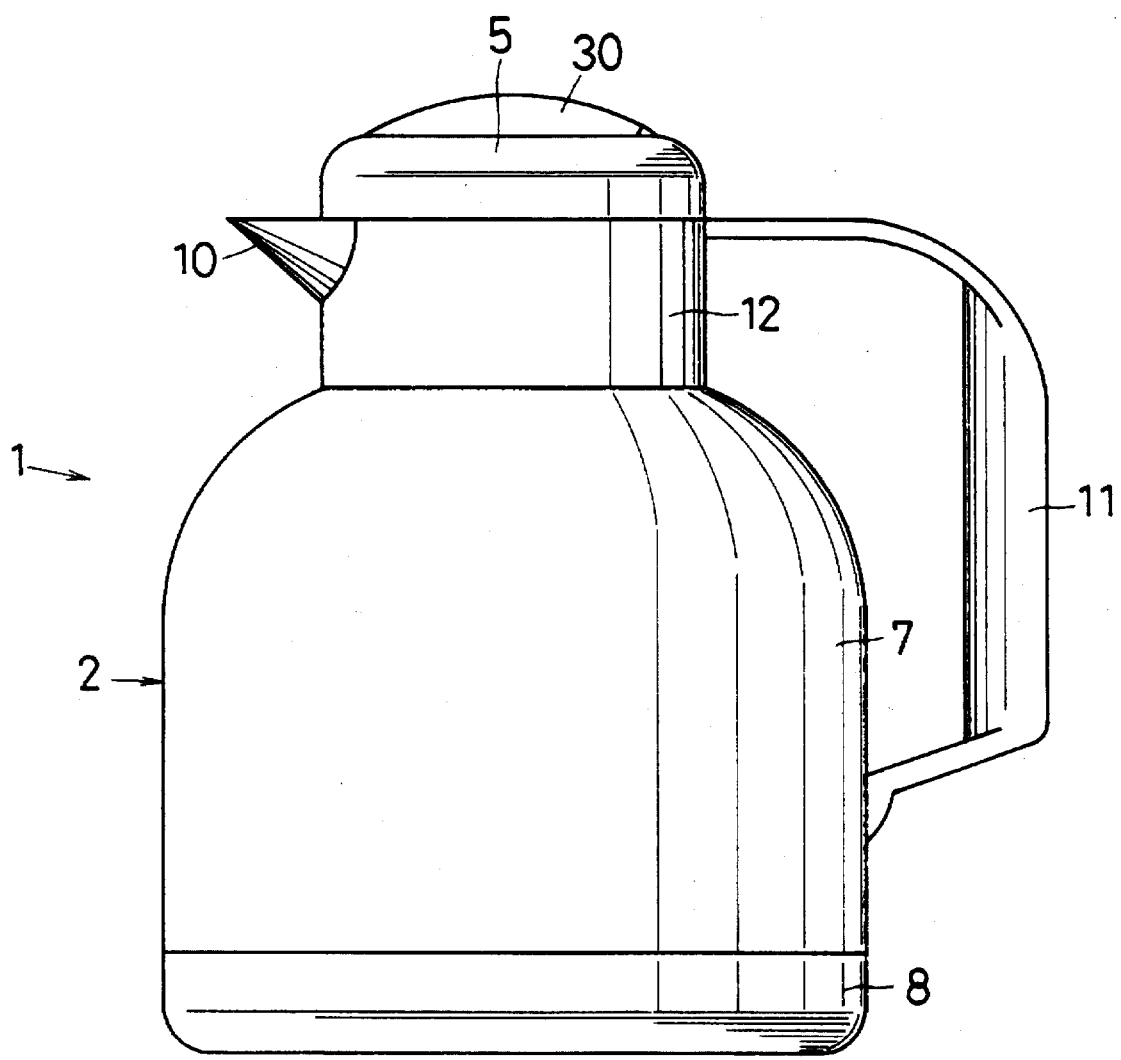
FIG. 1 is a side, view showing a thermos bottle of the invention.

Referring now to the drawings, an embodiment of the invention is described below.

Figure 2:
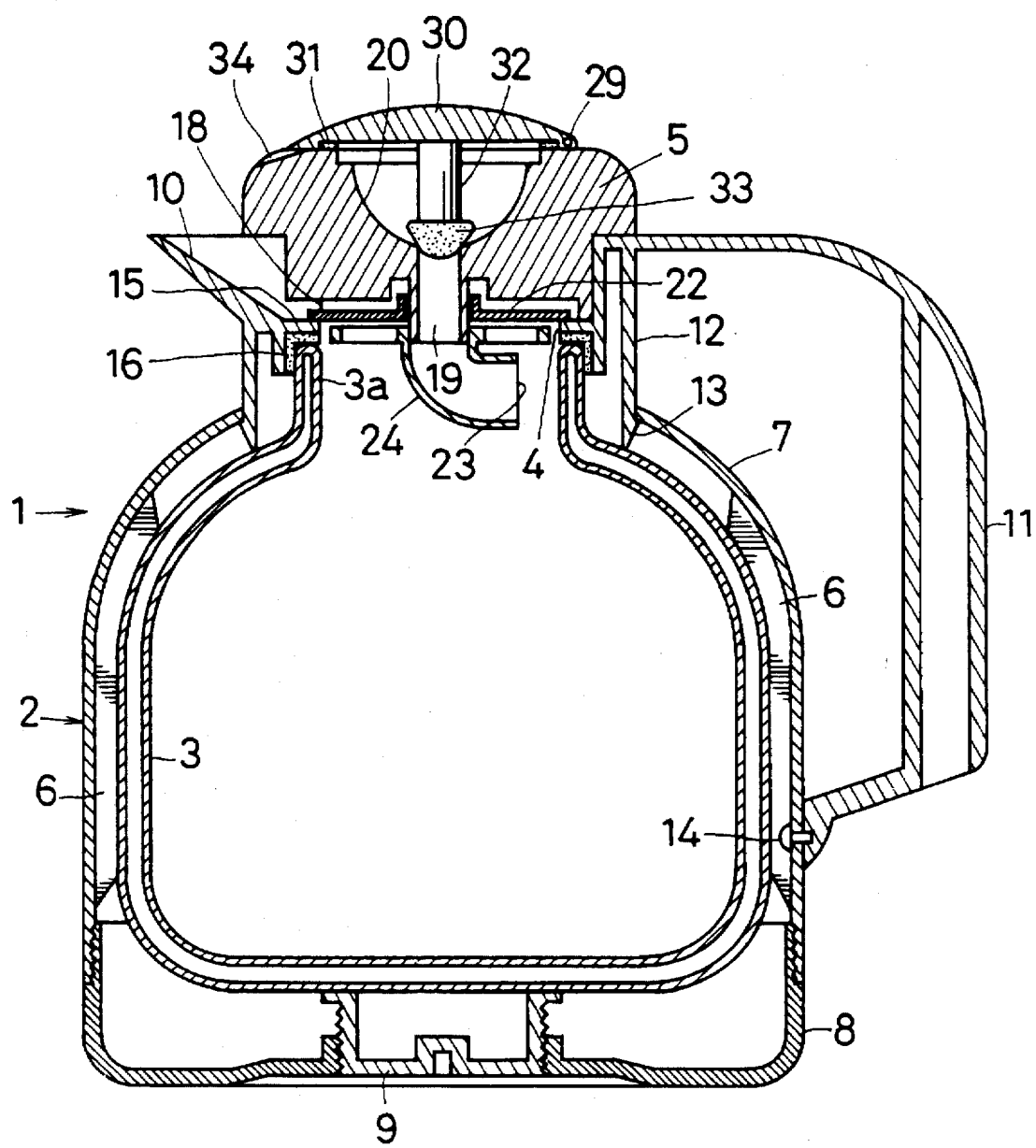
FIG. 2 is a side view showing a thermos bottle of the invention.

The drawings show a thermos bottle, in FIG. 1 and FIG. 2, this thermos bottle 1 comprises an outer container 2 made of synthetic resin, an inner container 3 of glass double wall structure for keeping hot or cold, disposed inside the outer container 2, and a plug member 5 made of synthetic resin detachably screwed into an upward opening 4 of the outer container 2 (more specifically the plug screwing part above the vicinity of the opening 4).

The outer container 2 is divided and formed into a main body 7 having plural ribs 6 for holding the inner container 3 within the inside, and three members, that is, a bottom lid 8 screwed and fixed in a downward opening of the main body 7, an adjuster member 9 screwed into the center of the bottom lid 8 for holding the inner container 3, and an upper member 12 integrally forming a pouring port 10 at one side and a handle 11 at other side, and hence forming is facilitated, and moreover an annular stopping piece 13 of the upper member 12 is press-fitted into an upper opening edge of the main body 7, and the lower part of the handle 11 and main body 7 are fixed by using screw 14 as fitting means.

Between an upper end opening 3a of the inner container 3 and a lower side of a flange 15 on the periphery of the upward opening 4 of the outer container 2, a ring-shaped seal member 16 is interposed, and the sealing performance is assured. Herein, the upper end opening 3a is designed to coincide with the upward opening 4 of the outer container 2 in the vertical direction.

Figure 3:
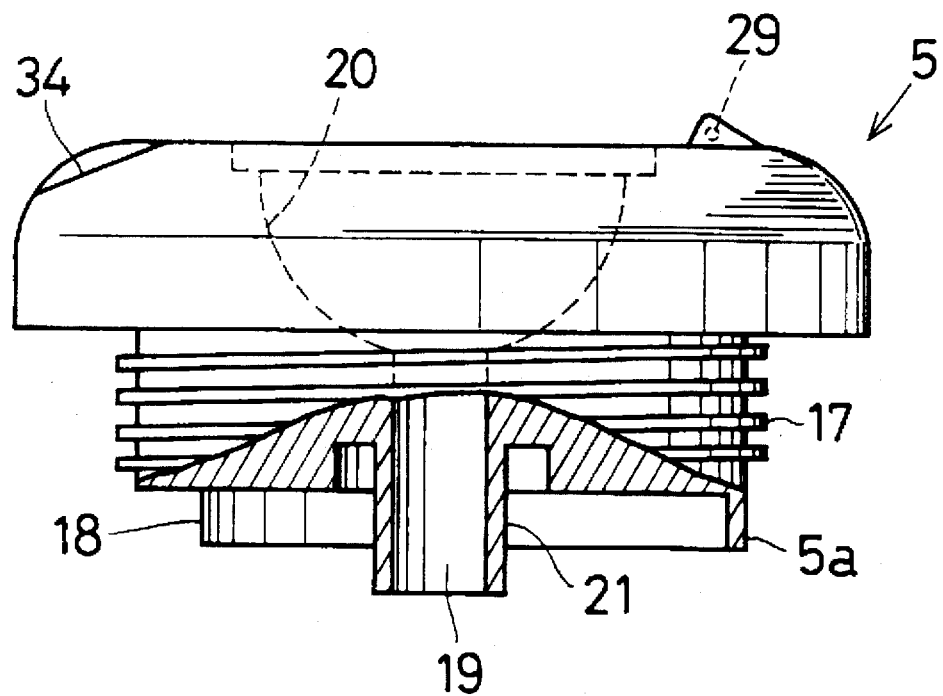
FIG. 3 is a magnified view of a plug member.

The plug member 5 has a threaded part 17 formed integrally on the outer circumference as shown in FIG. 3, and is detachably screwed into a threaded protrusion (not shown) formed at least partially on the corresponding part of the upper member 12 in the outer container 2, and when fixing of the plug member 5 is over, as shown in FIG. 2, a discharge part 18 as the opening end of a skirt 5a of the member 5 and the pouring part 10 of the outer container 2 confront each other.

In the plug member 5, further, a feed passage 19 for feeding coffee or other beverage from outside directly into the inner container 3 is formed, and a hemispherical recess of beverage temporary retaining part 20 is formed to communicate with the upper part of the passage 19.

Figure 6:
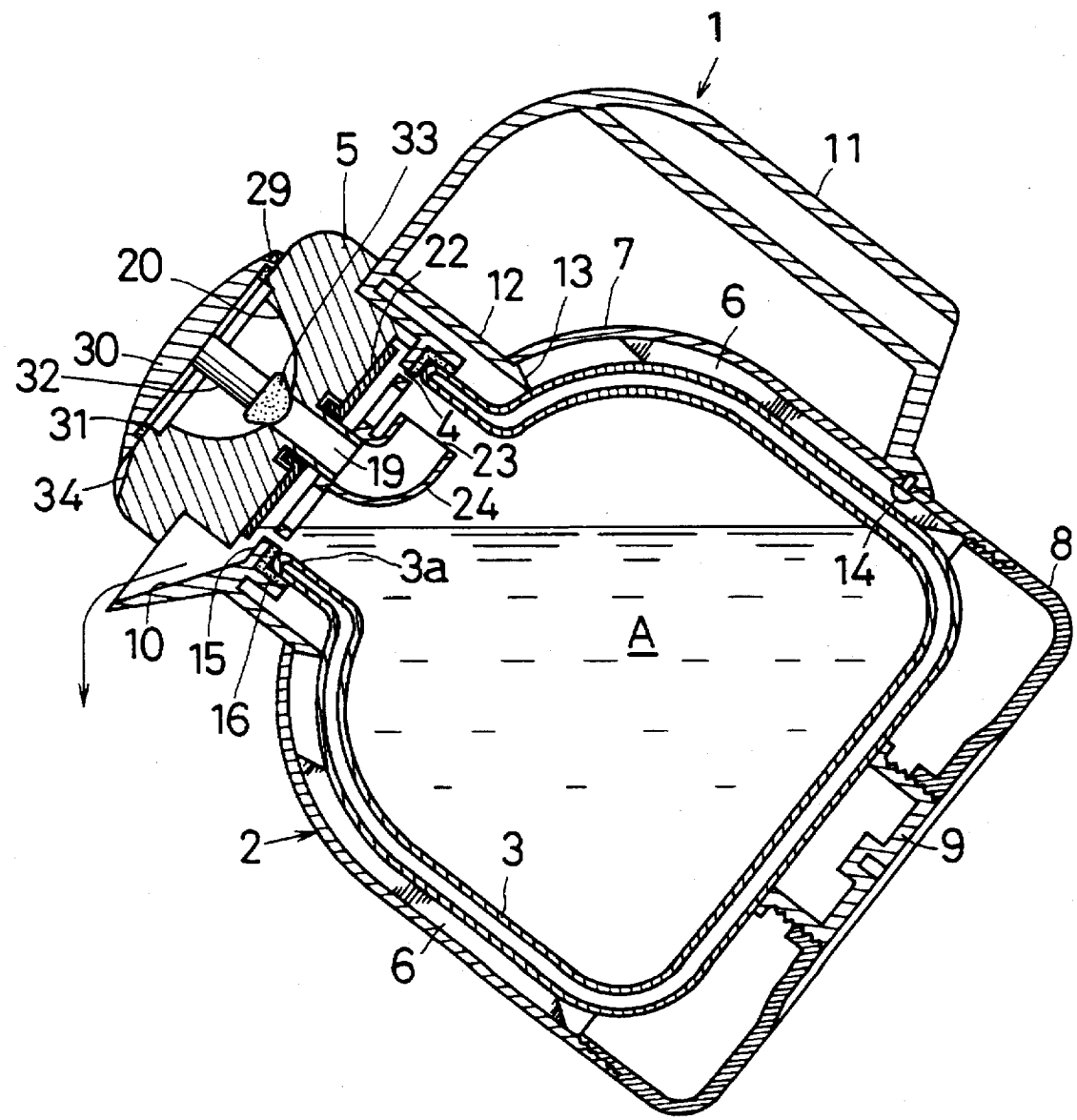
FIG. 6 is an explanatory diagram for pouring out beverage.
Figure 7:
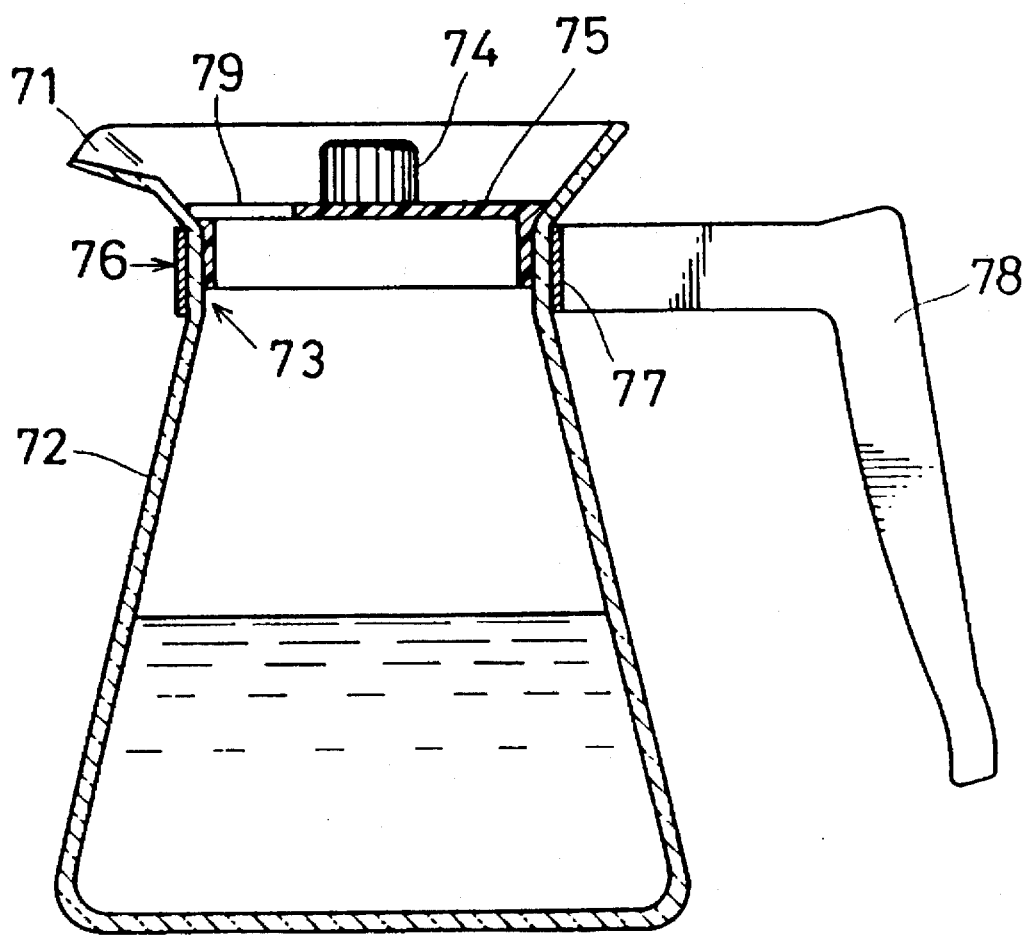
FIG. 7 is a sectional view showing a conventional serving pot.

On the outer circumference of a cylindrical part 21 as passage walk for composing the feed passage 19, there is a disk-shaped movable inner lid 22 (see FIG. 4) for closing the upward opening 4 of the outer container 2 moving down by its own gravity when normal (see FIG. 2), and communicating between the upward opening 4 and the pouring part 10 as being pushed down by the beverage A as shown in FIG. 6 when pouring out the beverage.

Figure 4:
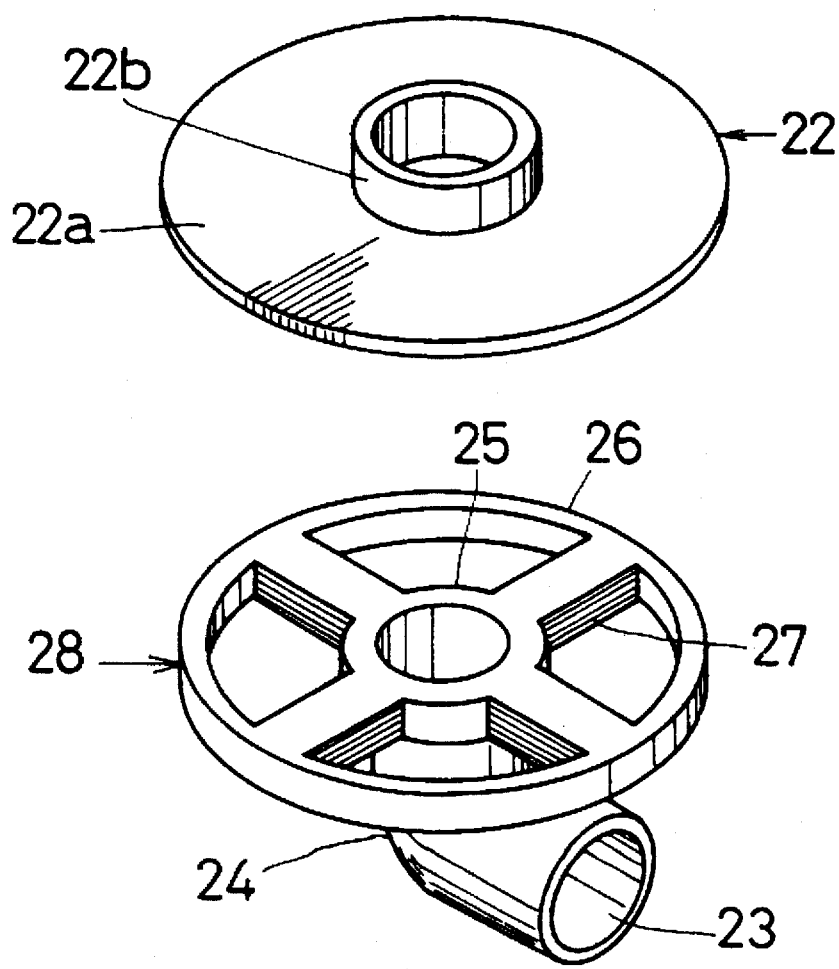
FIG. 4 is a perspective view of a movable inner lid and a passage member.

This movable lid 22 has a flange 22a and a tubular shaft 22b as shown in FIG. 4, and by fitting the tubular shaft 22b on the outer circumference of the cylindrical part 21, it is designed to move smoothly up and down.

At the lower end of the cylindrical part 21, as shown in FIG. 2 and FIG. 4, a passage member 24 bent and formed in an L-shape is fixed so that its opening 23 may be directed opposite to the pouring part 10, thereby preventing the movable inner lid 22 from slipping out, and the inside of the passage member 24 is communicating with the feeding passage 19. In this embodiment, at the upper end of the passage member 24, a flange body 28 stretching cross spokes 27 as seen on a plane view are integrally formed between the inner and outer rings 25, 26, but this flange body 28 is not an essential component.

On the other hand, at a support shaft 29 as a fulcrum for opening and closing the upper lid provided above the plug member 5, an upper lid 30 made of synthetic resin is provided so as to be free to open and close. At the lower side of the upper lid 30, a ring-shaped seal member 31 is affixed, and it is designed to seal between the upper side of the plug member 5 and the lower side of the upper lid 30 by this seal member 31, and a seal member 33 is fitted at the lower end of a protrusion 32 projecting in the middle of the lower side of the upper lid 30, and therefore, when closing the upper lid 30, the upper end of the feeding passage 19 is closed by the seal member 33. Between the upper lid 30 and plug member 5, convex and concave engaging parts (not shown) are formed for detachably engaging both parts 5, 30 by making use of elastic force intrinsic to the resin, and a dent 34 for manipulating the upper lid is formed at the plug member 5 side. Herein, as the opening and closing structure of the upper lid 30, the structure of the support shaft 29 may be replaced by other opening and closing structures by coupling both parts 5, 30 with a thin resin piece, and the opening and closing fulcrum of the upper lid 30 may be formed at the pouring part 10 side.

The embodiment is thus constituted, and operates as described below.

Figure 5:
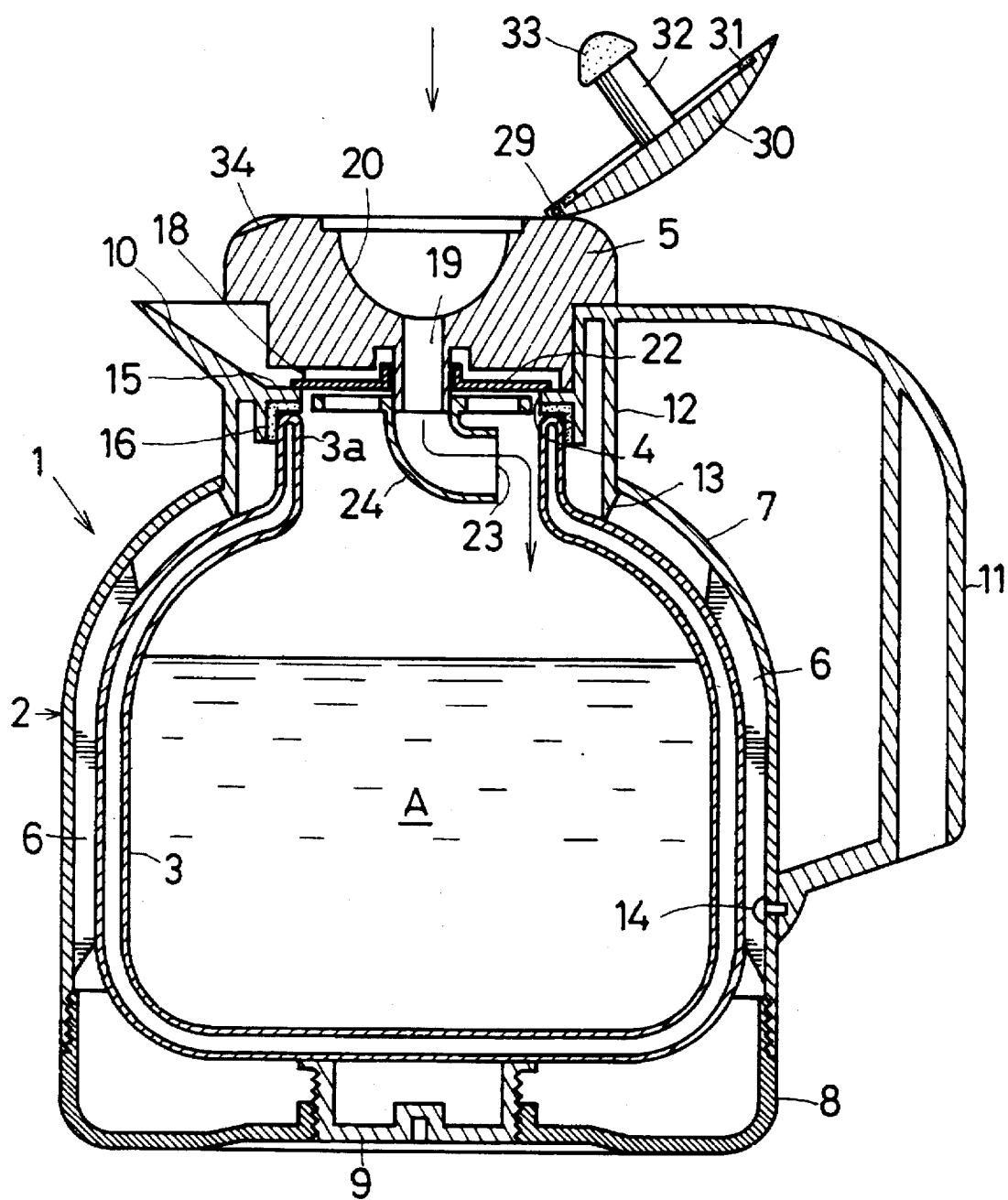
FIG. 5 is an explanatory diagram for pouring in beverage.

When feeding beverage A such as coffee from a coffee machine into thermos bottle 1, the closed upper lid 30 shown in FIG. 2 is opened as shown in FIG. 5, and the inside and outside of the plug member 5 communicate through the feeding passage 19, and it is not necessary to attach or detach the plug member 5 as in the prior art, and the beverage A can be directly poured into the inner container 3 from outside through elements 20, 19, 24 and 23, with the plug member 5 attached to the outer container 2. As a result, the ease of feeding operation is greatly enhanced.

In addition, the concave reservoir part 20 is formed above the feeding passage 19. Hence, overflow of the beverage A from above feeding in passage 19 when feeding the beverage can be prevented by use of this temporary reservoir part 20 when plug member 5 is disposed on bottle 1, the discharge part 18 (see FIG. 3) of the plug member 5 confronts the pouring part 10 of the outer container 2, and enables to discharge of the beverage smoothly when pouring.

Moreover, the movable inner lid 22 closes opening 4 of the outer container 2 when the bottle 1 is in a normal statae, i.e. the bottle 1 is positioned to be vertical as shown in FIG. 5, and prevents escape of steam or coldness outside (including aroma and flavor) of the beverage A contained inside when the bottle 1 is in the normal position, i.e. vertical, and when pouring out the beverage (see FIG. 6), the movable inner lid 22 is pushed upward by the beverage A to provide an opening between the upward opening 4 and pouring part 10, so that the beverage can be poured out.

In the feeding passage 19, a curved passage member 24 is provided having an opening 23 which is directed to the opposite side of the pouring part 10. Thus, when pouring out the beverage A, by inclining the thermos bottle 1 as shown in FIG. 6 by holding the handle 11, the structure of the passage 19 prevents counterflow (outflow) of the internal beverage A through the feeding passage 19 of the plug member 5.

Since the upper end of the feeding passage 19 and the opening side peripheral edge of the temporary reservoir part 20 are respectively sealed by two seal members 33, 31 at the closed upper lid 30 side, when the thermos bottle 1 is inclined as shown in FIG. 6, counterflow of the beverage A is prevented by the double seal arrangement. The double seal arrangement is also effective to preventing the steam or coldness (including aroma and flavor) of the beverage in the thermos bottle 1 from escaping to the outside thereof when the bottle 1 is in the normal positin, i.e. vertical, as well as preventing counterflow when pouring out the beverage.

The material and design of the members illustrated in the embodiment are only examples, and they are not limitative, and in claims 1 to 3, it may be also constituted so as to prevent slipping out of the movable inner lid 22 by using a locking pin in the cylindrical part 21. As to the beverage to be kept hot or cold in the thermos bottle 1, instead of the coffee shown in the example, it may be also other beverage such as tea and Japanese tea, or alcoholic drinks such as hot whiskey.

I claim:

1. In a thermos bottle comprising:
   an outer container having an opening at a top thereof and a spout formed extending from said opening;
   an inner container having an opening at a top thereof and disposed inside of said outer container with said opening thereof aligned with said opening of said outer container; and
   plug means positioned to fit within said aligned openings of said inner container and said outer container; the improvement comprising:
   said plug means comprising a curved passage way extending from said plug means and into said inner container, said curved passage way being constructed so that a curve thereof curves away from said spout so that a liquid is fed directly from outside the thermos bottle into said inner container so that a liquid contained within said inner container cannot flow back through said passage way when said thermos bottle is tilted to pour liquid through said spout from said inner container; wherein
   said plus means further comprises an inner lid for closing said opening of said inner container when said thermos bottle is in a vertical position; and wherein
   said inner lid is moved by said liquid so as to provide an opening in said opening of said inner container when said thermos bottle is tilted to pour liquid from said inner container through said spout.

2. The thermos bottle of claim 1, wherein said plug means further comprises a concave reservoir formed above said curved passage way.

3. The thermos bottle of claim 1, wherein said plug means further comprises a passage member having an opening disposed to be opposite said spout.

* * * * *